May 26, 1959 P. G. PARKES 2,887,896
POWER ASSISTED STEERING MECHANISM
Filed Aug. 8, 1956 2 Sheets-Sheet 2
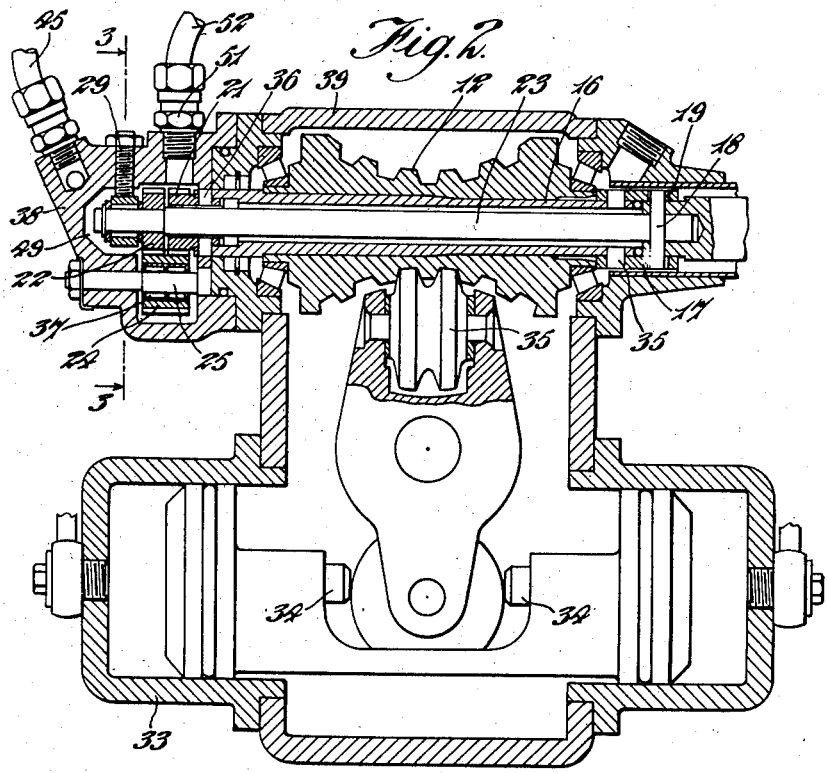
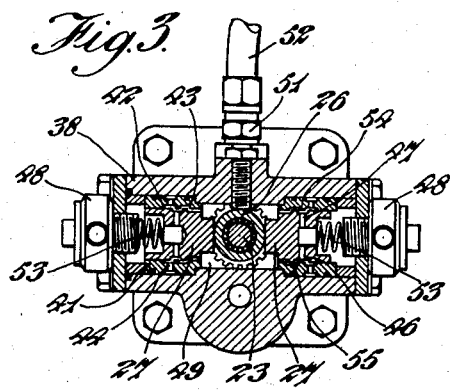
INVENTOR
PHILIP G. PARKES
By Taulmin & Taulmin
Attorneys

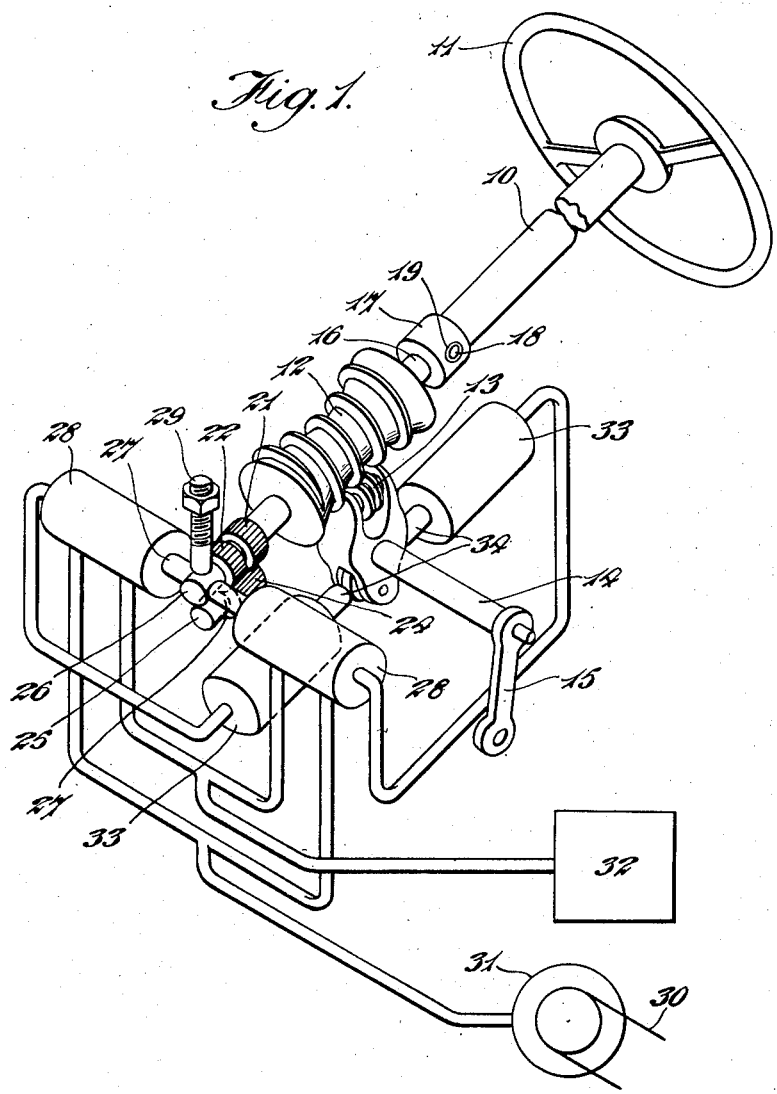

United States Patent Office 2,887,896
Patented May 26, 1959

2,887,896

POWER ASSISTED STEERING MECHANISM

Philip Guy Parkes, Luton, England, assignor to Adamant Engineering Company Limited, Luton, England, a British company Application August 8, 1956, Serial No. 602,829

Claims priority, application Great Britain August 23, 1955

6 Claims. (Cl. 74—388)

This invention relates to power-assisted steering mechanism for vehicles, and it has for its object to provide an improved construction and arrangement which is more adaptable than those hitherto devised. The improved system moreover is arranged to operate more efficiently by manual effort at such times as the power-assistance is not available.

The invention is particularly concerned with power-assisted steering mechanism of the general form described in U.S. Patent No. 2,650,669 and in our British Patent 760,968. In both these cases auxiliary gearing is operatively interposed between the rotatable steering shaft of a steering pillar, and the input of the steering gearbox, a fluid pressure control valve being operated by reaction forces arising from this auxiliary gearing when the steering shaft is turned.

In a power-assisted vehicle steering mechanism comprising a steering shaft, a steering gear box adapted to be operated thereby, a fluid pressure valve device for controlling a power assistance motor, and auxiliary gearing operatively interposed between the steering shaft and the steering gear box, the mechanism being arranged so that the valve device is operated by reaction of the auxiliary gearing, according to the invention a lost motion connection, independent of the auxiliary gearing, is provided between the steering shaft and the steering gear box.

The auxiliary gearing preferably comprises a train of intermeshing gear wheels, of which two wheels forming the end members of the train are substantially co-axial and are connected respectively to the steering shaft and to the input shaft of the steering gear box, one gear wheel of said train being mounted for lateral deflection and arranged to operate the valve device by said deflection.

The laterally moveable gear wheel is preferably connected to the steering shaft, and the lost motion connection independent of the auxiliary gearing may comprise a diametral pin passing through holes in the steering shaft and in the input shaft of the steering gear box, the holes in one of the shafts being formed to allow slight angular movement of the pin relative to that shaft.

The invention is hereinafter described with reference to the accompanying drawings, in which:

Figure 1 is a diagrammatic perspective view of a steering mechanism embodying the invention;

Figure 2 is a longitudinal sectional elevation of the steering gear box, steering shaft and auxiliary gearing; and Figure 3 is a transverse section on the line 3—3 of Figure 2.

Referring to Figure 1, the steering mechanism comprises the usual steering shaft 10 carrying a steering wheel 11 at its upper end, and a steering gear box in which is mounted an hour-glass worm 12 co-axial with the steering shaft, and a roller-arm follower 13, the follower being carried by an output shaft 14 which has mounted on it the usual drop arm 15. The input shaft 16 of the steering gear box, on which is mounted the worm 12, carries a collar 17 at its upper end, and a lost motion connection between the steering shaft 10 and the shaft 16 is provided. In the drawing, this lost motion connection comprises a pin 18, fitting tightly in a diametral hole in the steering shaft, and extending into clearance holes in the collar 17, one of the clearance holes being shown at 19. Alternatively, the lost motion connection may be provided by a toothed dog coupling with clearance between the teeth, or by a splined shaft and sleeve with clearance. At its other end, the shaft 16 carries a pinion 21 which is substantially co-axial with another pinion 22 mounted on an extension 23 of the steering shaft 10 passing through the shaft 16. Both of the pinions 21 and 22 are in mesh with a third pinion 24 rotatably mounted on a shaft 25 parallel to the shaft 16, the three pinions constituting auxiliary gearing, in parallel with the lost motion connection also connecting the steering shaft 10 to the input shaft 16 of the steering gear box. The shaft extension 23 which is flexible also carries a roller 26 which is engaged at diametrically opposite points by the plungers 27, 27 of two valve units 28, 28. The roller 26 is able to move to a small extent in the direction of the axes of the valve units 28, 28 owing to the flexibility of the said shaft extension. A diameter of the roller 26, at right angles to that on which the axes of the plungers 27, 27 lie, passes through the axis of the pinion 24 when the pinion 22 is co-axial with the pinion 21, and an abutment member 29, having a flat surface perpendicular to that diameter, restrains the pinion 22 against movement away from the pinion 24. The valve units 28, 28 control the flow of liquid delivered by a pump 31, driven, for example by a belt 30, from the engine of the vehicle to which the steering gear is fitted, the arrangement being such that, when both valves are in a neutral position the liquid is returned through both of them to a reservoir 32, movement of the valve plungers due to displacement of the roller in one direction restricting the return of liquid to the reservoir through one valve unit and causing pressure to build up in one of two motor cylinders 33, 33 the pistons 34, 34 of which act on the follower 13, and allowing liquid from the other motor cylinder to escape to the reservoir. Displacement of the roller in the other direction causes pressure to build up in the other motor cylinder 33 and allows liquid to return to the reservoir from the first-mentioned motor cylinder.

Referring to Figure 2, the shaft extension 23 which carries the pinion 22 is secured to the steering shaft 10 by the pin 18, the shaft 10 being axially recessed to receive the end of the extension 23 and the pin fitting closely in diametral holes in the said shaft 10 and extension 23. The sleeve 17 formed with the holes 19 is fixed to the input shaft 16 of the steering gear box by dowel pins 35. The pinion 21 is similarly secured to the other end of the input shaft 16 by dowel pins 36. The valve units 28, 28, and the auxiliary gearing, are mounted in a valve housing 38 forming a closure for the lower end of the steering gear box 39. The pinion 24 is mounted on roller bearings 37 on an eccentric portion of the shaft 25, to permit adjustment of the mesh between the pinions 24 and 21, and the abutment member 29 comprises a stud screwed into the valve housing 38.

Each of the valve units comprises a sleeve 41 mounted in a bore in the valve housing 38 (Figure 3), the bore of the sleeve being formed with two circumferential grooves 42 and 43, and the groove 42 nearer to the outer end of the bore being connected by ports 44 and drillings in the valve housing to a conduit 45 (Figure 2) leading from the pump 31. The valve plungers 27 slide in the sleeves 41, each plunger 27 being reduced in diameter at its inner end, and housing a circumferential groove 46 spaced a short distance from the reduced portion. Radial passages 47 in the plunger lead from the groove 46 into an axial recess in the outer end thereof. The outer end of each valve bore is connected by a fitting 48 or similar device to a conduit leading to one of the motor cylinders 33, and the chamber 49 between the two valve bores is connected, by a fitting 51 and conduit 52 (Figure 2) to the reservoir 32.

The valve plungers 27 are urged by springs 53 against the roller 26. When the said roller is in the neutral position the land 54 between the grooves 42 and 43 in the sleeve, which is slightly narrower than the groove 46, is opposite the middle of that groove, as shown in Figure 3, and the land 55 on the plunger, between the reduced end thereof and the groove 46, is opposite the groove 43, the groove being of such a width that inward movement of the plunger is insufficient to bring the land to the inner side of the groove. Both the motor cylinders, and the return conduit to the reservoir, are therefore connected to the pump. There is a small degree of restriction of flow back to the reservoir, so a slight pressure is maintained in the motor cylinders, the pressures in the two being substantially equal. When the roller is displaced to one side or the other, one valve plunger 27 is moved inwardly and the other is moved outwardly.

The valve plunger that is moved inwardly partially or wholly closes the groove 42 in its associated sleeve, thus restricting the flow of liquid from the pump, and at the same time increases the passage for the return of liquid from the corresponding motor cylinder to the reservoir. The valve plunger that is moved outwardly partially or wholly cuts off the motor cylinder to which it is connected from the reservoir, and, by increasing the overlap between the grooves 42 and 46, increases the flow thereto from the pump. A difference of pressure is therefore produced in the two motor cylinders, and the pistons therein are displaced in one direction or the other to assist the operation of the steering gear.

The sideways displacement of the roller 26 is produced by torque reaction in the auxiliary gearing. Owing to the clearance between the pin 18 and the holes 19, the steering shaft 10, when moved to effect steering, turns slightly relative to the input shaft 16 of the steering gear box. The pinion 22 therefore turns slightly relative to the pinion 24, and owing to the resistance to movement of the pinion 24, this relative turning is accommodated by the pinion 22 rolling on the pinion 24 which results in lateral displacement of the pinion 22 and roller 26 which is required to operate the valve units.

The power exerted by the motor cylinders causes the hour-glass worm 12 to follow up the movement of the steering shaft 10, so that the valve plungers 27, 27 tend to return to their normal positions and centralize the roller 26. The degree of movement of steered wheels connected to the drop-arm 15 is therefore dependent on the distance through which the steering wheel 11 is turned.

The arrangement of the present invention is particularly convenient in practice, since the valve housing 38, carrying the valves and the auxiliary gearing constituted by the pinions 21, 22 and 24 can be secured to a steering gear box in place of the usual bottom cover, and the lost motion device is readily accommodated in the usual hollow steering column.

The auxiliary gearing, as well as the lost motion device, may be interposed between the lower end of the steering column and the steering gear box.

An important advantage of the present invention, as compared with the known form of power-assisted steering mechanism of the same general form, is that the auxiliary gearing has only to bring about the operation of the control valve device, and it can therefore be of relatively light construction; the auxiliary gearing does not have to transmit the working forces between the steering shaft and the input of the steering gear box during direct manual steering (i.e. without power assistance), for these forces are transmitted by the lost motion coupling.

I claim:

1. A power-assisted vehicle steering mechanism comprising a steering shaft having a rigid portion and a flexible portion, a steering wheel mounted on said rigid portion, a steering gear box having an input shaft, a lost-motion connection between said rigid portion of the steering shaft and said steering gear box input shaft, auxiliary gearing operatively interposed between said flexible portion of the steering shaft and said steering gear box input shaft and including a gear wheel mounted on said flexible portion so as to be movable transversely of the axis of said steering shaft by flexure of said flexible portion thereof, a power-assistance motor operatively connected to said steering shaft, and a fluid pressure valve device operatively connected to said flexible portion of the steering shaft for controlling said power assistance motor, said valve device being operated by transverse movement of the gear wheel due to torque reaction in the auxiliary gearing when the steering wheel is turned.

2. A power-assisted vehicle steering mechanism comprising a steering shaft; a steering gear box having an input shaft; there being an extension on said steering shaft; there being openings in said steering shaft, said steering shaft extension, and input shaft of said steering gear box; a pin tightly received in the openings in said steering shaft and said steering shaft extension; the openings in the input shaft of said steering gear box being formed to allow slight angular movement of the pin relative to said input shaft so as to form a lost-motion connection; said lost-motion connection being between said steering shaft and said steering gear box input shaft to operate said steering gear box by said steering shaft; auxiliary gearing operatively interposed between the extension on said steering shaft and said steering gear box input shaft, said auxiliary gearing being at the end of said steering gear box input shaft remote from said lost-motion connection; a power-assistance motor operatively connected to said steering shaft; and a fluid pressure valve device operatively connected to said auxiliary gearing for controlling said power-assistance motor.

3. A power-assisted vehicle steering mechanism as claimed in claim 1 with said lost motion connection comprising opposed openings in the steering shaft and in the input shaft of said steering gear box, a diametrically extending pin passing through the holes in said steering shaft being tightly received therein and through the holes in the input shaft of said steering gear box, the holes in the said input shaft being formed to allow slight angular movement of the pin relative to that shaft.

4. A power-assisted vehicle steering mechanism according to claim 1 wherein the rigid portion of said steering shaft terminates at one end of the steering gear box, and the auxiliary gearing is mounted at the other end of said steering gear box, said steering gear box input shaft being hollow, the flexible portion of said steering shaft passing through said hollow input shaft to connect the steering shaft to said auxiliary gearing.

5. A power-assisted vehicle steering mechanism according to claim 4 wherein the lost-motion connection is at the end of the steering gear box remote from the auxiliary gearing.

6. A power-assisted vehicle steering mechanism as claimed in claim 5 with said lost motion connection comprising holes passing through said input shaft of the steering gear box and the flexible portion of said steering shaft, a diametrally extending pin passing through the holes in said input shaft and said flexible portion of said steering shaft and being tightly received in said holes in said last named shaft, the openings in the input shaft of said steering gear box being formed to allow a slight angular movement of the pin relative to that shaft.

References Cited in the file of this patent

UNITED STATES PATENTS

| | | |
|---|---|---|
| 1,910,600 | Fitch | May 23, 1933 |
| 2,650,669 | Hammond | Sept. 1, 1953 |
| 2,707,375 | Hammond | May 3, 1955 |

FOREIGN PATENTS

| | | |
|---|---|---|
| 760,968 | Great Britain | Jan. 28, 1955 |